United States Patent
Bhagwan et al.

(10) Patent No.: US 11,799,981 B2
(45) Date of Patent: *Oct. 24, 2023

(54) SYSTEM AND METHOD OF CONTENT SELECTION USING SELECTION ACTIVITY IN DIGITAL MESSAGING

(71) Applicant: YAHOO ASSETS LLC, Dulles, VA (US)

(72) Inventors: Varun Bhagwan, San Jose, CA (US); Suhas Sadanandan, Pleasanton, CA (US); Doug Sharp, San Francisco, CA (US)

(73) Assignee: YAHOO ASSETS LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/876,666

(22) Filed: Jul. 29, 2022

(65) Prior Publication Data

US 2022/0374481 A1 Nov. 24, 2022

Related U.S. Application Data

(63) Continuation of application No. 15/074,585, filed on Mar. 18, 2016, now Pat. No. 11,405,475.

(51) Int. Cl.

| H04L 67/50 | (2022.01) |
| H04L 67/306 | (2022.01) |
| G06Q 30/02 | (2023.01) |
| H04L 51/18 | (2022.01) |

(Continued)

(52) U.S. Cl.
CPC .......... *H04L 67/535* (2022.05); *G06F 16/951* (2019.01); *G06F 16/957* (2019.01); *G06Q 30/02* (2013.01); *H04L 51/18* (2013.01); *H04L 67/306* (2013.01)

(58) Field of Classification Search
None
See application file for complete search history.

(56) References Cited

U.S. PATENT DOCUMENTS

| 7,769,740 B2 | 8/2010 | Martinez et al. | |
| 8,738,433 B2 * | 5/2014 | DiOrio | G06Q 90/00 705/14.1 |
| 2005/0033771 A1 | 2/2005 | Schmitter et al. | |

(Continued)

FOREIGN PATENT DOCUMENTS

| WO | WO-02059804 A1 * | 8/2002 | ............. G06Q 30/02 |
| WO | WO-2007133047 A1 * | 11/2007 | ............. G06Q 30/02 |
| WO | 2009060467 A2 | 5/2009 | |

*Primary Examiner* — Dhairya A Patel
*Assistant Examiner* — Sandarva Khanal
(74) *Attorney, Agent, or Firm* — James J. DeCarlo; Greenberg Traurig, LLP

(57) ABSTRACT

Information is collected about a user, e.g., the user's interests, from the user's interaction with digital messaging content. Information collected about the user can be used to identify an interest of the user. The identified interest(s) can be used to select content to be presented to the user. By way of a non-limiting example, information collected in response to the user clicking on a link in an electronic mail, email, message can be used to identify one or more content items to be presented to the user. By way of yet another non-limiting example, the identified content item(s) can comprise advertising content, news articles, etc.

15 Claims, 11 Drawing Sheets

(51) Int. Cl.
*G06F 16/957* (2019.01)
*G06F 16/951* (2019.01)

(56) References Cited

U.S. PATENT DOCUMENTS

| | | |
|---|---|---|
| 2007/0011020 A1 | 1/2007 | Martin |
| 2008/0010319 A1 | 1/2008 | Vonarburg et al. |
| 2008/0027798 A1* | 1/2008 | Ramamurthi ...... G06Q 30/0277 |
| | | 705/14.54 |
| 2009/0024469 A1 | 1/2009 | Broder et al. |
| 2009/0171763 A1* | 7/2009 | Dong ..................... G06Q 10/04 |
| | | 705/14.69 |
| 2011/0066615 A1 | 3/2011 | Pradhan et al. |
| 2012/0089691 A1 | 4/2012 | Chowdhury et al. |
| 2012/0116882 A1* | 5/2012 | Sanghavi ........... G06Q 30/0257 |
| | | 705/14.55 |
| 2013/0036344 A1* | 2/2013 | Ahmed ............... G06F 16/9535 |
| | | 715/205 |
| 2013/0110648 A1 | 5/2013 | Raab et al. |
| 2013/0117214 A1 | 5/2013 | Davis et al. |
| 2013/0124447 A1* | 5/2013 | Badros .................. G06Q 50/01 |
| | | 706/45 |
| 2013/0311925 A1* | 11/2013 | Denker ................ G06F 16/332 |
| | | 715/771 |
| 2014/0012836 A1 | 1/2014 | Bercovici |
| 2014/0025660 A1* | 1/2014 | Mohammed ....... G06Q 30/0241 |
| | | 707/722 |
| 2014/0278308 A1* | 9/2014 | Liu ...................... G06F 16/958 |
| | | 703/6 |
| 2014/0280549 A1 | 9/2014 | Rajan et al. |
| 2014/0280890 A1 | 9/2014 | Yi et al. |
| 2015/0220566 A1 | 8/2015 | Cumming et al. |
| 2015/0256499 A1 | 9/2015 | Kumar et al. |
| 2015/0269488 A1* | 9/2015 | Galai .................... G06Q 30/02 |
| | | 706/11 |

* cited by examiner

```
{'suhas@yahoo.com,  //userId
    data: {
        country: 'US',
        zip: '94089',
        interests: {
            'sports',
            'finance',
            'music'
        },
        recentLinkClicks: {
        },
        browser: 4,
        lastLoggedIn: 1450260553,
        ...
        ...
    }
}
```

Fig. 4

```
('suhas@yahoo.com,   //userId  ⟵ 402
    data: {
            country: 'US',
            zip: '94089',
            interests: {
                    'sports',
                    'finance',
                    'music',
                    'Iceland',   // keyword directly got from link click data
                    'travel',    // inferred based on a targeting taxonomy.
                                    Iceland belongs to 'travel' category in the
                                    taxonomy.
                    'geysir'    // inferred
                    'reykjavic' // inferred
            },
            recentLinkClicks: {
                    {
                            href:     'https://www.amazon.com/gp/r.html?c=3RBZPAH49E741
                                      &R=36EAPCQEPN8RL7T=C&U=...&ref=pe_848010_153856710
                                      _em_1p_1_ti',
                            sndr:     'amazon.com',
                            subj:     'Iceland (Insight Guides) and more',
                            fldr:     'Inbox',
                            cntnt:    'Top 10 Iceland (Eyewitness Top 10 Travel Guide)'
                    },
                    // There could be more records such as above, based on
                        user's recent link clicks.
            },
            broswerType: 4,
            lastLoggedIn: 150260553,
            ...
            ...
    }
}
```

504: country, zip, interests block
506: interests inferred items
510: recentLinkClicks
508: broswerType, lastLoggedIn
500: overall structure

Fig. 5

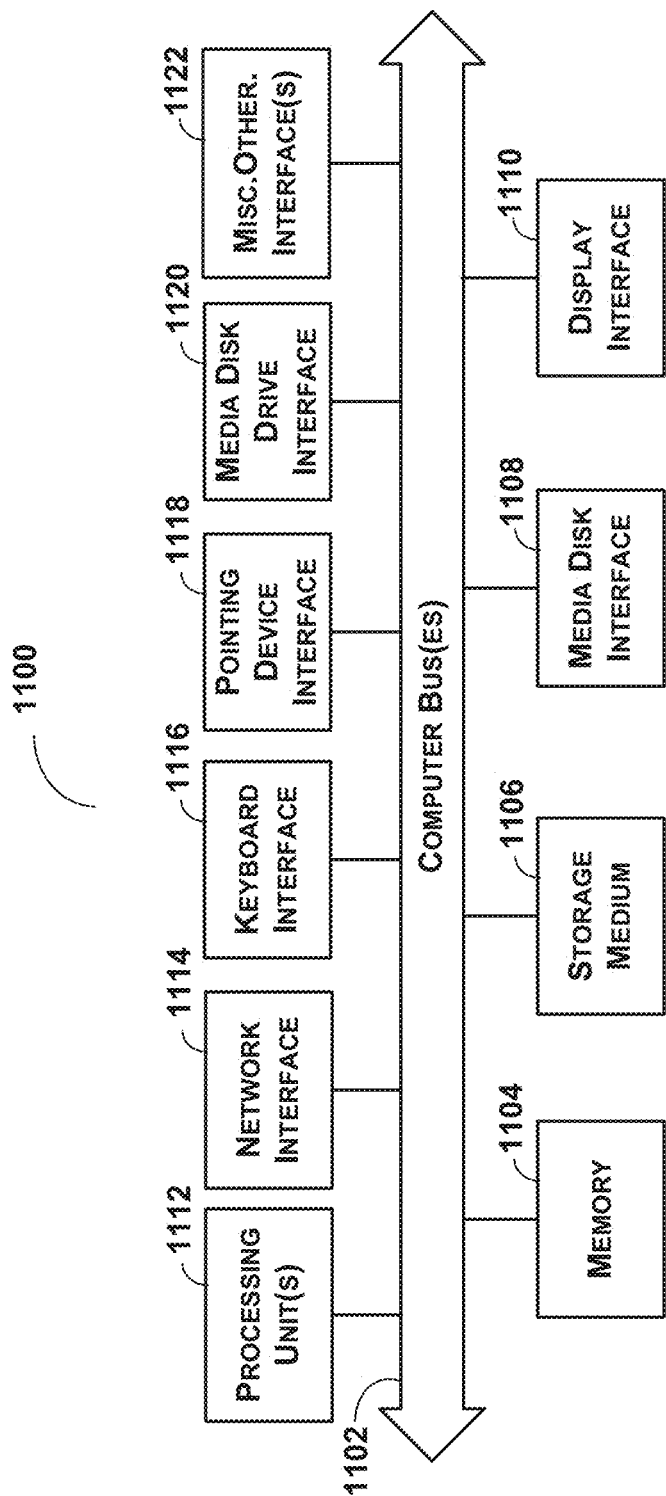

SYSTEM AND METHOD OF CONTENT SELECTION USING SELECTION ACTIVITY IN DIGITAL MESSAGING

CROSS REFERENCE TO RELATED APPLICATIONS

This application is a continuation of, and claims priority from, co-pending U.S. patent application Ser. No. 15/074,585, filed Mar. 18, 2016, entitled SYSTEM AND METHOD OF CONTENT SELECTION USING SELECTION ACTIVITY IN DIGITAL MESSAGING, the contents of which are hereby incorporated by reference.

FIELD OF THE DISCLOSURE

The present disclosure relates to identifying content for presentation at a user computing device in accordance with user interests determined from electronic digital message user activity.

BACKGROUND

Digital messages, such as electronic mail messages, text messages, may include links, such as universal resource locators, that are selectable by a message recipient. The selectable links can be links to products, services, etc.

SUMMARY

Embodiments of the present disclosure collect information about a user, e.g., the user's interests, using data collected in connection with the user's interaction with digital messaging content. Information collected about the user can be used to identify an interest of the user. The identified interest(s) can be used to select content to be presented to the user. By way of a non-limiting example, information collected in response to the user clicking on a link in an electronic mail, email, message can be used identify one or more content items to be presented to the user. By way of yet another non-limiting example, the identified content item(s) can comprise new content, images, multimedia, audio, video, news articles, etc.

In accordance with one or more embodiments, a method is provided, the method comprising detecting, by a computing device in communication with a digital messaging application executing at a user's computing device, the user's link selection made within a digital message displayed by the digital messaging application at the user's computing device; collecting, by the computing device and in response to detecting the user's link selection, information comprising data from the user-selected link contained in the digital message and metadata retrieved from the digital message; determining, by the computing device and using at least one interest taxonomy, an interest of the user using the collected information, the at least one user interest for use in identifying at least one content item to be presented to the user at the user's computing device.

In accordance with one or more embodiments a system is provided, the system comprising at least one computing device, each computing device comprising a processor and a storage medium for tangibly storing thereon program logic for execution by the processor, the stored program logic comprising: detecting logic executed by the processor for detecting, in connection with a digital messaging application executing at a user's computing device, the user's link selection made within a digital message displayed by the digital messaging application at the user's computing device; collecting logic executed by the processor for collecting, in response to detecting the user's link selection, information comprising data from the user-selected link contained in the digital message and metadata retrieved from the digital message; determining logic executed by the processor for determining, using at least one interest taxonomy, an interest of the user using the collected information, the at least one user interest for use in identifying at least one content item to be presented to the user at the user's computing device.

In accordance with yet another aspect of the disclosure, a computer readable non-transitory storage medium is provided, the medium for tangibly storing thereon computer readable instructions that when executed cause at least one processor to detect, in connection with a digital messaging application executing at a user's computing device, the user's link selection made within a digital message displayed by the digital messaging application at the user's computing device; collect, in response to detecting the user's link selection, information comprising data from the user-selected link contained in the digital message and metadata retrieved from the digital message; determine, using at least one interest taxonomy, an interest of the user using the collected information, the at least one user interest for use in identifying at least one content item to be presented to the user at the user's computing device.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides an overview of a process in accordance with one or more embodiments of the present disclosure.

FIG. 2 provides an example of a digital message for use in accordance with at least one embodiment of the present disclosure.

FIG. 3 provides an example of a digital message for use in accordance with one or more embodiments of the present disclosure.

FIG. 4 provides an example of a user's interest profile in accordance with one or more embodiments of the present disclosure.

FIG. 5 provides an example of an updated interest profile in response to detected user activity in accordance with one or more embodiments of the present disclosure.

FIG. 6 provides a process flow example in accordance with one or more embodiments of the present disclosure.

FIG. 7 provides an example of an interest taxonomy for use in identifying user interest in accordance with one or more embodiments of the present disclosure.

FIG. 8 provides an example of a process flow used in analyzing collected data to identify a user interest in accordance with one or more embodiments of the present disclosure.

FIG. 9 provides a process flow example in accordance with one or more embodiments of the present disclosure.

FIG. 11 is a detailed block diagram illustrating an internal architecture of a computing device in accordance with one or more embodiments of the present disclosure.

DETAILED DESCRIPTION

Figure 1:
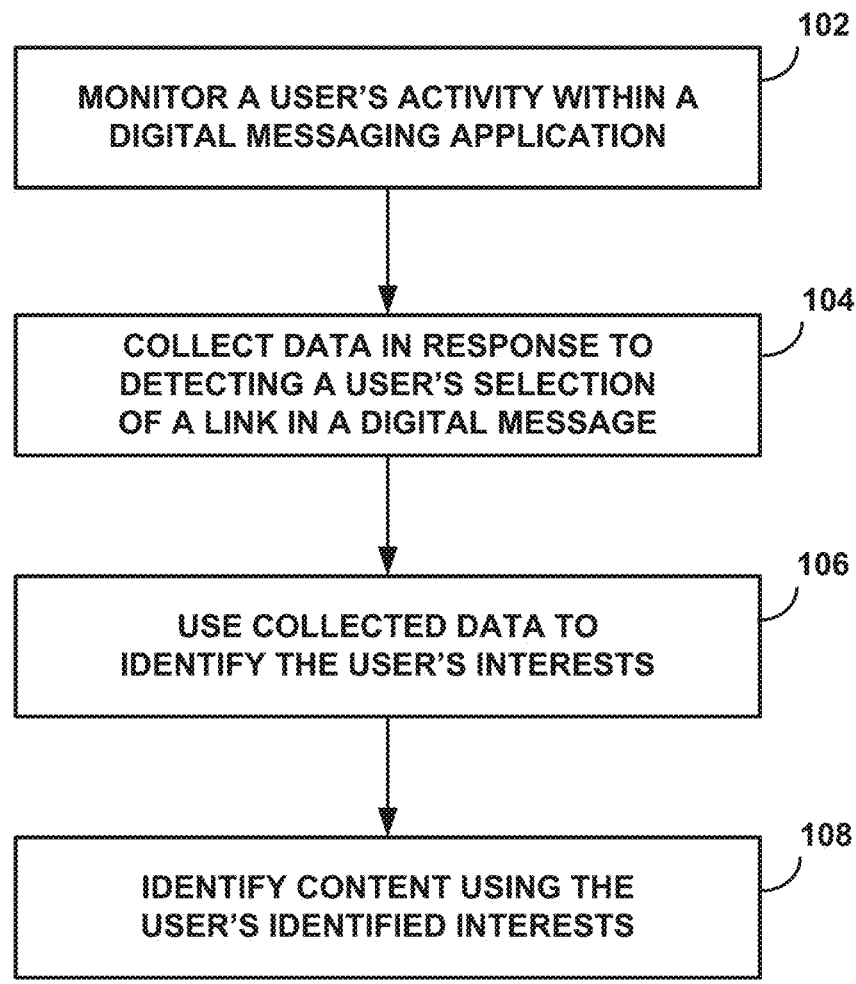

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion. Certain embodiments of the present disclosure will now be discussed with reference to the aforementioned figures, wherein like reference numerals refer to like components.

In general, the present disclosure includes a content selection system, method and architecture, which uses selection events, or activity, in digital messaging, which messaging can include digital messages, e.g., email, text, short, etc. messages, received by a number of computer users sent from a number of senders, e.g., advertisers, marketers, ecommerce merchants, etc. For the sake of simplicity, the following description refers to a digital message as an email, or email message. It should be apparent that any type of digital message can be used in connection with any aspect of the present disclosure.

An email can contain a number of links, e.g., such as links to products, services, etc. Such links can be considered to be native advertisements. Embodiments of the present disclosure can be used to understand and analyze click events, or activity, on such links within one or more digital messaging applications, in connection with any type of digital messages, including without limitation email messages, text messages, etc.

Embodiments of the present disclosure can be used in monetizing links selected, or clicked, by users in emails received by the users. Embodiments of the present disclosure use information, e.g., metadata, associated with the clicked link, or clicked universal resource locator (URL), and information collected from the destination of the URL.

FIG. 1 provides an overview of a process in accordance with one or more embodiments of the present disclosure. At step 102, a digital messaging application is monitored to detect a user's activity within the digital messaging application.

By way of a non-limiting example, an event handler can be used with the digital messaging application, e.g., a mobile or desktop mail application. The event handler monitors a user's activity within the application, e.g., the user's interaction with each digital message within the application. The event handler can detect and log any interaction, including a user's selection of a link contained in a message accessed by the user using the messaging application. Using an event handler with a user's mobile and desktop digital messaging applications, each link selected, e.g., clicked, by the user within each of the user's emails within each messaging application being monitored can be detected and logged.

For each detected event, e.g., an activity such as and without limitation a user's link selection, data that can be collected, or logged, at step 104. By way of a non-limiting example, the data collected can include content of an anchor tag selected by the user, which can include image URLs, a link target, e.g., a landing web page's URL specified in the selected link, and/or other data, e.g., metadata, of the digital message, such as and without limitation a sender's information, such as and without limitation a sender's name and/or messaging address, message subject, identifier, e.g., a name, of the mail folder containing the message, etc.

At step 106, the data collected in response to the detected user events can be analyzed to identify the user's interests.

In accordance with one or more embodiments, an analyzer can be used to analyze data collected from each event detected by an event handler and identify a user's interests. In accordance with at least one embodiment, the analyzer can include a keyword extractor and categorizer. In accordance with one or more embodiments, the collected data can comprise a number of keywords and/or phrases, or canonical forms of keywords and phrases, corresponding to one keywords or phrases in a taxonomy.

In accordance with one or more embodiments, a user may link on a link referencing a web page, or landing page. In such a case, the landing page's contents can be fetched and analyzed and categorized against a same or different target taxonomy used with the data extracted from the selected link.

In accordance with one or more embodiments, the analyzer can determine a user's interest using a taxonomy, such as a tree classification, generated from a dictionary of terms, such as and without limitation a dictionary comprising commercial terms. The taxonomy can be generated using a number of dictionaries, each of which identifying terms that can be used to generate the taxonomy.

In accordance with one or more embodiments, the analyzer can determine a user's interest using a number of decision trees, such as and without limitation classification trees, which can be generated using a number of term dictionaries. Decision tree learning can be used to create a model, or models, used to make predictions about a user's interest(s). A predicted outcome of a classification tree comprises a class, e.g., an interest, to which data, e.g., data extracted from one or more events detected in accordance with one or more embodiments of the present application.

In accordance with one or more embodiments, data collected and analyzed can be mapped to an interest taxonomy, such as and without limitation an interest taxonomy such as that used by Yahoo!® and/or Google®. In accordance with at least one embodiment, an interest taxonomy can be a taxonomy, e.g., a tree classification, of keywords. By way of a non-limiting example, a set of keywords in the taxonomy can represent one or more interests, where the set can comprise one or more keywords in the taxonomy. It should be apparent that any taxonomy can be used with embodiments of the present disclosure.

Data collected in response to a detected event, or events, can be pre-processed using a number of tokenizers to extract base keywords from a link and/or contents of a web page identified by a link, and the keywords can be compared to keywords in a taxonomy to determine if there is a match. If a match exists, a determination can be made whether to add the keyword to the user's interest profile. By way of a non-limiting example, the keyword "Iceland" may be added, and a top-level category for the keyword, e.g., "travel", can be added to the user's interest profile. In this example, the keywords "Iceland" and "travel" can be considered to be interests of the user, which were identified from one or more selections detected by an event handler in accordance with at least one embodiment. In addition, nodes of the decision tree below the matched keyword, e.g., "Iceland, can be added to an inferred keyword list. By way of some non-limiting examples, in a taxonomy tree, keywords such as c, which might be children of the "Iceland" keyword's node, can be inferred from the "Iceland" keyword. In accordance with one or more embodiments, each inferred keyword, or inferred interest, can be added to the user's interest profile, e.g., as an inferred interest of the user.

In accordance with one or more embodiments, machine learning can be used to train a model using one or more model generation approaches, such as and without limitation term frequency-inverse document frequency (tf-idf), Bag-of-words, Latent Dirichlet allocation (LDA), Topic, etc. model approaches. A trained model can be used to receive input, such as and without limitation data collected from one or more detected events, and provide output, such as and without limitation a number of predictions of a user's interest(s). Model output may provide a probability associated with each interest identified by the model.

By way of a non-limiting example, an interest taxonomy can comprise a number of nodes, each corresponding to a concept and annotated, or otherwise associated, with a number of user interests associated with a concept represented by the node. An interest taxonomy, or taxonomies, can be used to identify a user's interest. A user's interests can be used to identify, or target, content for presentation to the user.

By way of a further non-limiting example, the content can comprise advertisement content, and the interest taxonomy can be used for ad targeting. By way of some further non-limiting examples, advertisers can use the identified interests to book ad campaigns and/or the identified interests can be used to influence the weights for existing targeting data used by existing campaigns. A click-based identification of user interest can be used by entities, such as and without limitation online advertisers and marketers, to provide such entities with an opportunity to target users in an accurate and timely manner.

At step 108, the user's identified interest(s) can be used to identify content for presentation to the user. The content can be used to personalize a web page to include content selected for the user using the interest(s) identified for the user. The content can be news articles, weather, news, advertisements, audio, video, multimedia, etc. content.

In accordance with one or more embodiments, the identified user interest, which can be in the form of an interest profile, can be used to provide personalized content, such as news articles, search results, multimedia content, etc., to a user, such as in a web page, media player, etc. By way of some non-limiting examples, a web page can be customized to include travel articles, articles about traveling to/in Iceland, news articles involving Iceland, articles about the history, culture, etc. of Iceland. By way of some further non-limiting examples, recommendations can be generated and provided to the user using the user's identified interests, such as and without limitation, user groups, books, music, movies, photographic images, etc. recommendations. The examples provided herein are not intended to be limiting in any way, and are meant to be illustrative.

Embodiments of the present disclosure can collect data associated with a user-selected URL, e.g., data contained in the URL and data surrounding the URL in the message, with data from the URL destination's web page and the web page's classification. The data that is collected can be used to generate a detailed and accurate interest graph of each messaging user.

While embodiments of the present disclosure are described using terms such as interest graph, interest taxonomy and interest profile, any structure can be used for associating a user and the interests identified for the user.

Figure 2:
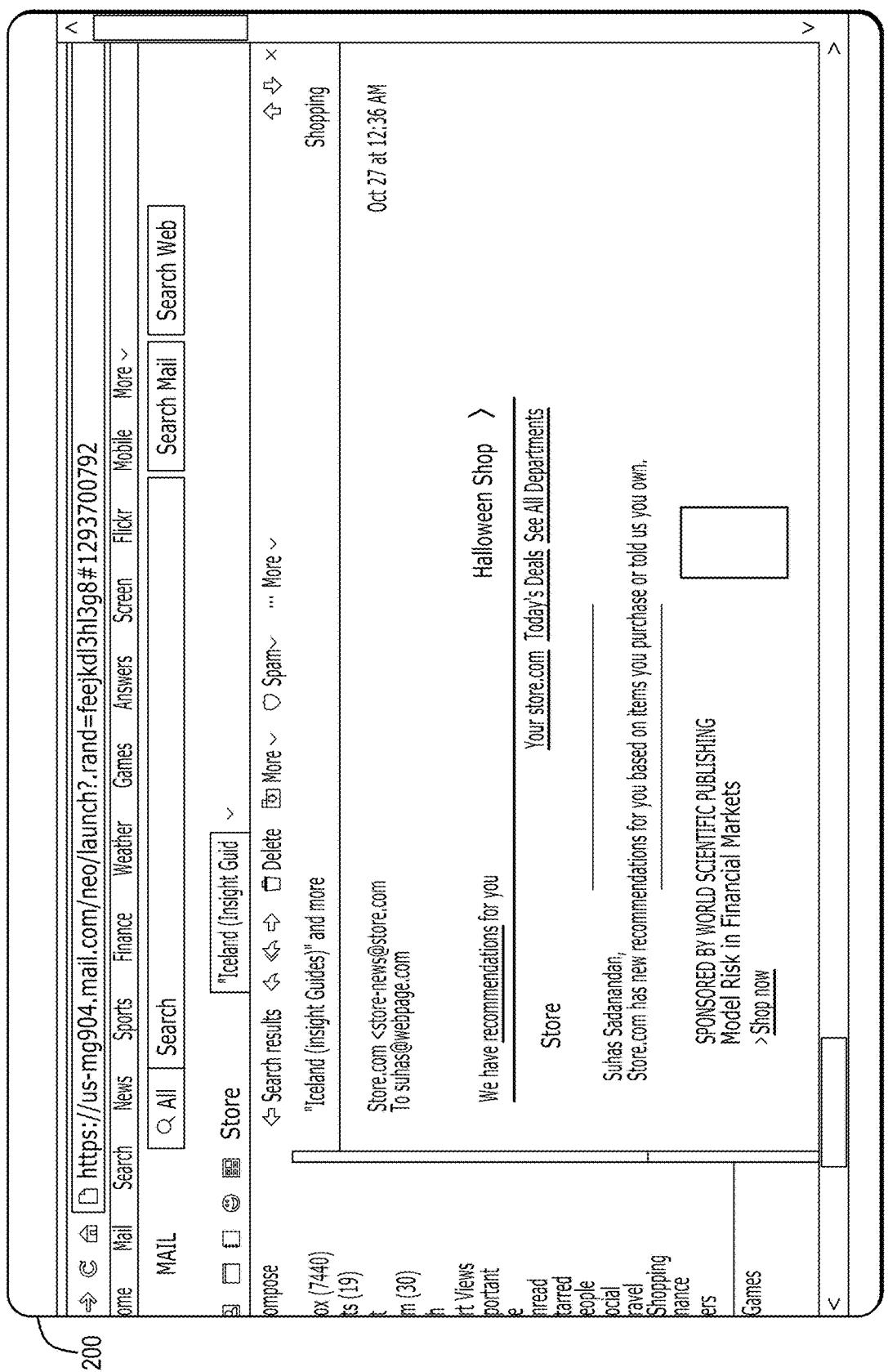

FIG. 2 provides an example of a digital message for use in accordance with at least one embodiment of the present disclosure. In the example, the digital message is displayed in user interface 200, which can be an interface of a digital messaging application. The digital message in the example is an email message sent to a user at the address, suhas@yahoo.com. The email address is sent by an online merchant, Amazon®. The email address of the sender is store-news@amazon.com. The email contains recommendations for the user based on items that the user purchased and/or that the user indicated that he owned. The subject of the email is Iceland (Insight Guides) and more. The message is stored in the user's Inbox.

Figure 3:
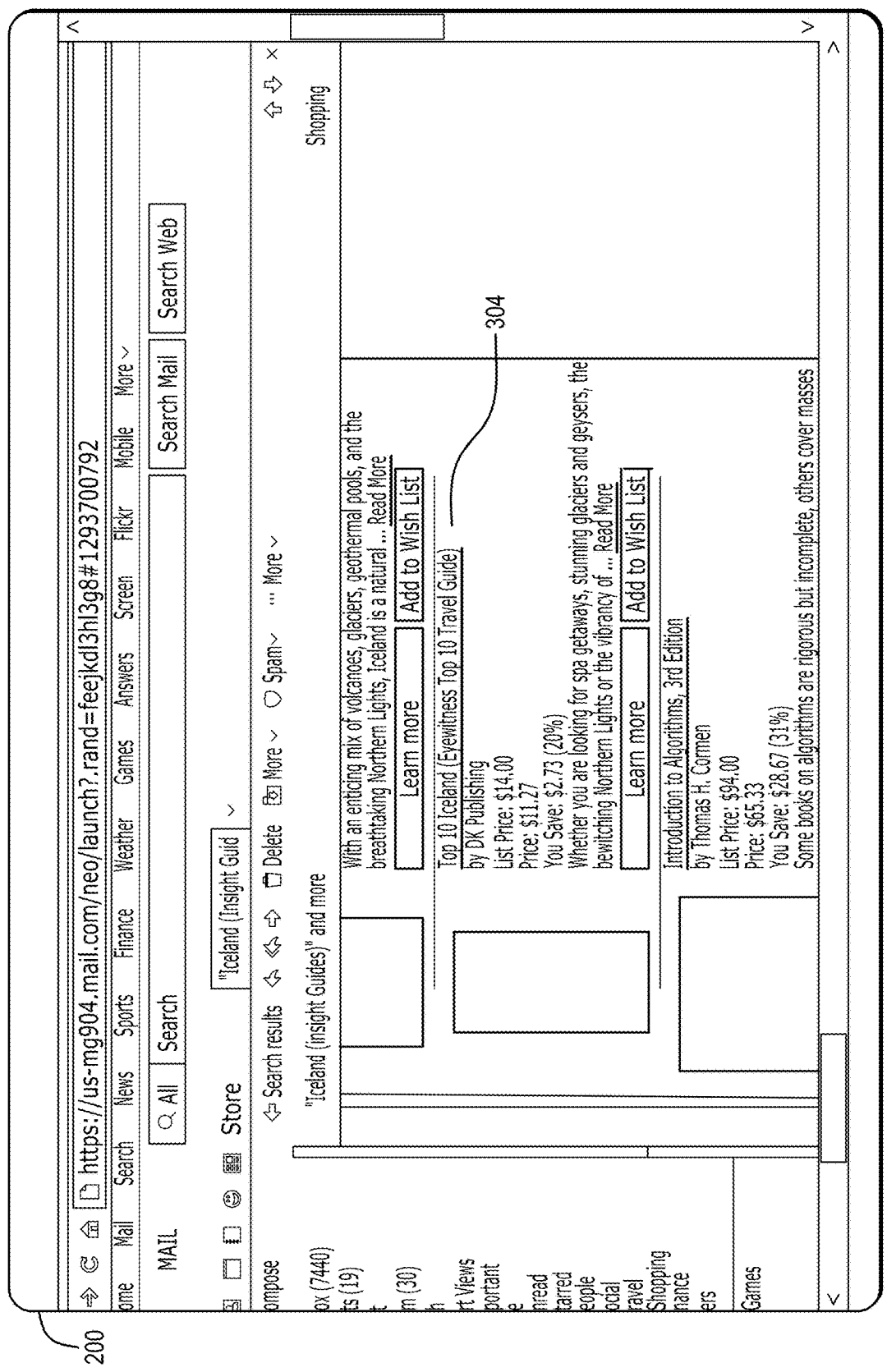

FIG. 3 provides some additional contents of the digital message shown in FIG. 2, which can be used in accordance with one or more embodiments of the present disclosure. In the example shown in FIG. 3, the email message contents include a hyperlink, or link, 304 to a travel guide entitled Top 10 Iceland (Eyewitness Top 10 Travel Guide). Link 304 is selectable by the user to open a web page, e.g., the travel guide's product web page served by Amazon.com.

A user's selection of link 304 in the email message displayed by an email message application, which may be a browser application, a client computer application, server application etc., can be detected. A detected link selection can result in the collection of data that can be used to identify the user's interest(s). A user's interest profile can be updated to include any identified interest(s).

FIG. 4 provides an example of a user's interest profile in accordance with one or more embodiments of the present disclosure. In the example, interest profile 400 includes user identification information, e.g., a userID. Other non-limiting examples of information stored in the user's interest profile includes user data segment 404, which can include user data, such as and without limitation a country, e.g., the user's resident country, zip code, e.g., the user's resident zip code and the user's interest(s). Interest profile 400 can further include a recent click information section 406 and section 408, which can include browser information and information identifying a user's login history.

The interest profile shown in the example of FIG. 4 illustrates contents of the user's interest profile prior to the user's selection of link 304 of FIG. 3. FIG. 5 provides an example of an updated interest profile of the user in response to detected user activity in accordance with one or more embodiments of the present disclosure.

In the example shown in FIG. 5, the interest profile 500 includes user identification information 402, such as and without limitation the user's user identifier, or userid. The user's interest profile includes user data 504, which includes the user's interest(s). The user's interest profile includes a recent click section 506, which includes information associated with the user's selection of link 304. The user's interest profile 500 can further include section 508, which can include browser information and information identifying a user's login history.

Section 510 can include such information as the sender's domain, e.g., @amazon.com, which can be extracted from the sender's email address. The sender's email address, which is available from the email header, contains the sender's domain. In the example email shown in FIGS. 3 and 4, the sender's email address is store-news@amazon.com. The subject of the message can be extracted. In the example, the subject extracted from the email message is Iceland (Insight Guides) and more. In the example shown in FIG. 3, the information included in the link selected by the user is retained. In the example, the user selected a link corresponding to a travel guide entitled Top 10 Iceland (Eyewitness Top 10 Travel Guide), and the following provides an example of the selected link:

href: https://www.amazon.com/gp/r.html?C=3RBZPAH49E741
&R=36EAPCQEPN8RL&T=C&U=. . .
&ref=pe_848010_153856710_em_1p_1_ti Other information collected in response to the detected link selection can include the folder containing the message and content extracted from the web page referenced by the link. By way of a non-limiting example, the extracted content can include the title of the of the travel guide book, e.g., Top 10 Iceland (Eyewitness Top 10 Travel Guide). Other information that can be collected includes any content from the digital message, content of a web page referenced by a link, metadata associated with an image, etc. By way of some further non-limiting examples, content can include image content, multimedia content, audio content, video content, etc. Content can also include textual content.

In the examples shown herein, the digital message is a message received by the user. It should be apparent that the digital message may be a message sent by the user. By way of a non-limiting; example, a user's interest can be determined from a link inserted by the user in an email message before the user sends the email message to one or more recipients.

With reference to FIG. 5, the user's interests are updated to include additional interests identified for the user using the information collected from the user's activity in connection with the user's digital messages. In the example of FIG. 5, the user's interests are updated to include interests identified using data collected from the user's activities. For example, the user's interest in Iceland is identified from collected user activity data, e.g., link click data, associated with the user's selection of link 304. In accordance with one or more embodiments, an interest of the user can be inferred using one or more interest taxonomies and data collected from the user's activities with a number of digital messages. By way some additional non-limiting examples, the user's interest(s) in travel, Geysir and Reykjavic can be inferred using at least one interest taxonomy. In addition, a user interest can be identified in the collected data, e.g., a user's interest in Iceland is identified from the email's subject and/or from the link click data.

Figure 6:
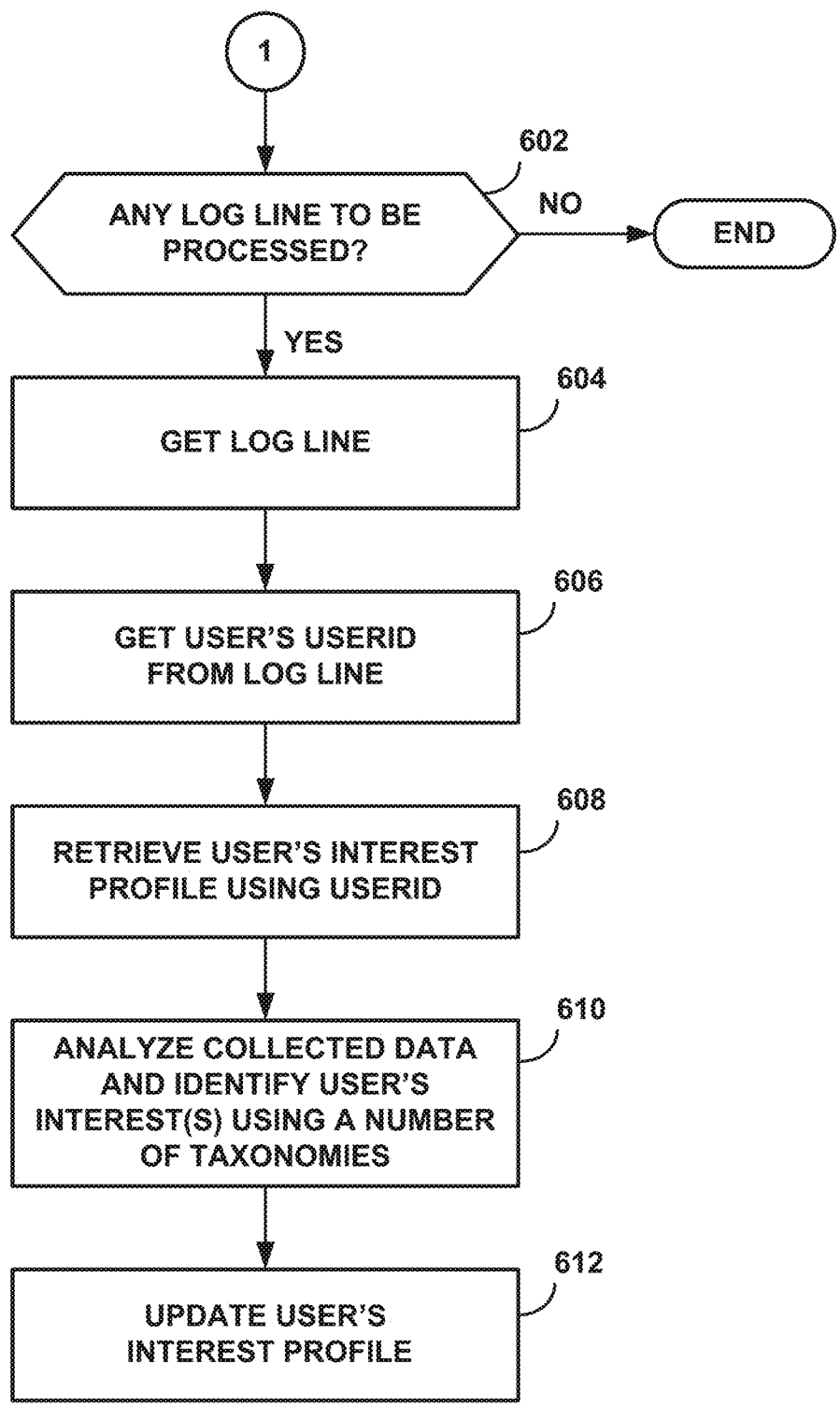

FIG. 6 provides a process flow example in accordance with one or more embodiments of the present disclosure. In the example shown in FIG. 6, user activity in, or in connection with, a digital message is logged, and each entry associated with a user can be processed to identify the user's interests. The log entry, or log line, can be part of a link click data stream, and each log line in the link click data stream can be processed to update the user's interest record, or interest profile.

At step 602, a determination is made whether or not any log line in the link click data stream remains to be processed for the user. By way of a non-limiting example, a log line corresponding to the user's selection of link 304 can be included in the link click data stream. Processing ends if it is determined that there are no log lines remaining to be processed.

If it is determined that a log line remains to be processed, processing continues at step 604 to get the next log line to be processed. At step 606, user identification information, such as a user identifier, or userid, is extracted from the log line's data. The extracted userid is used to retrieve the user's interest profile record, at 608. By way of a non-limiting example, a stored, e.g., remote, copy of the user interest profile record can be retrieved through a remote procedure call (RPC).

At step 610, data collected in connection with the detected activity is used to identify the user's interest(s). As discussed herein, an interest can be a keyword, key phrase, etc. extracted from the collected data, an interest inferred using collected data, etc. By way of a non-limiting example, an interest can be inferred using one or more taxonomies, data collected about the user in connection with the detected activity, information stored in the user's interest profile, which includes previously-identified interests of the user, etc.

Figure 7:
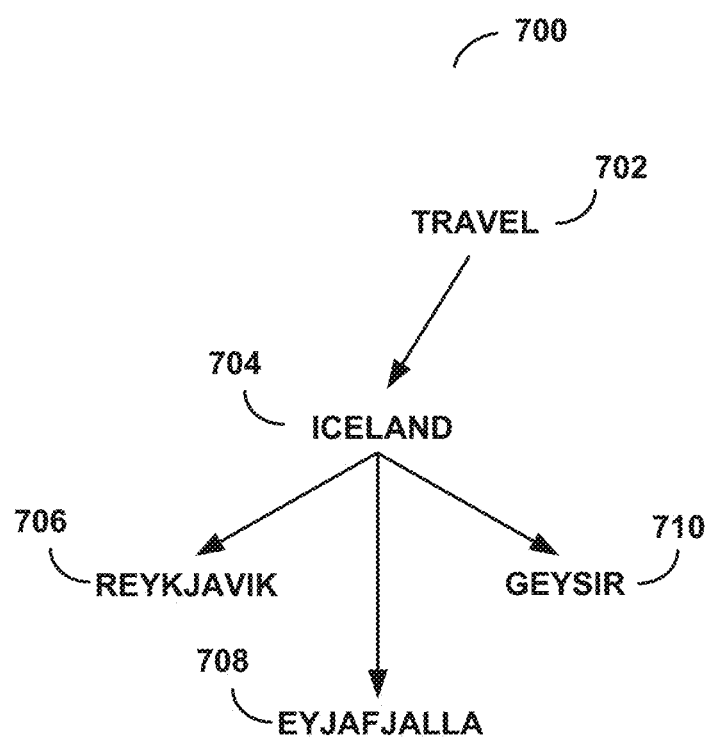

FIG. 7 provides an example of an interest taxonomy for use in identifying user interest in accordance with one or more embodiments of the present disclosure. The interest taxonomy 700 can be used in analyzing the collected data to identify the user's interest(s).

In the example shown in FIG. 7, the interest taxonomy is a tree-like structure comprising nodes, each of which represents an interest. Each interest represented in the interest taxonomy can be a candidate interest of the user, which can be identified using data collected from the detected activity of the user in a digital messaging application. With reference to FIGS. 2 and 3, data collected in response to the user's selection of link 304 can be processed using a tokenizer to extract base keywords. The base keyword Iceland is one example of a base keyword obtained from the data collected in response to user selection of node 304 of FIG. 3.

Figure 8:
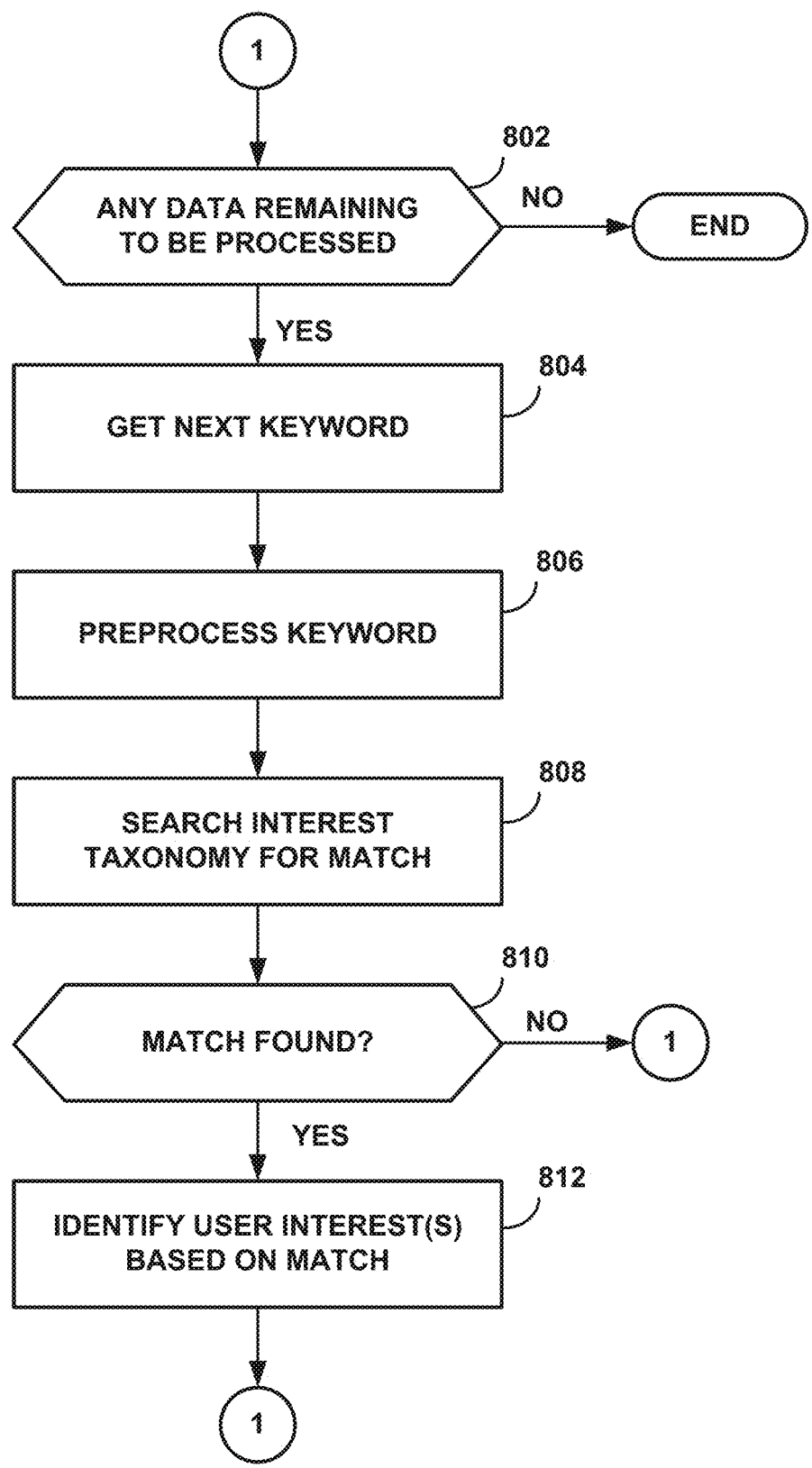

FIG. 8 provides an example of a process flow used in analyzing collected data to identify a user interest in accordance with one or more embodiments of the present disclosure. The process shown in the example of FIG. 8 can be performed as at least a part of the analysis performed at step 610 of FIG. 6.

In accordance with one or more embodiments, the data collected for a user comprises a number of keywords, each of which can comprise one or more words. Each keyword, e.g., the Iceland keyword, can be used to search the interest taxonomy 700 of FIG. 7 to locate an interest included in the interest taxonomy 700. By way of a non-limiting example, node 704 in the interest taxonomy 700 matches the Iceland base keyword. An interest can be added to the user's interest profile in response to finding an interest in the interest taxonomy 700 matching a keyword identified from data collected from one or more events detected in a digital messaging application. In the example of 7, an interest in Iceland can be added to the user's interest profile in response to locating node 704 in interest taxonomy 700 using the keyword Iceland.

A match between a base keyword and a node in the interest taxonomy 700 is identified as a direct interest of the user. If the identified node has a parent node, the interest associated with the parent node can be added as a direct interest of the user. In addition to direct interests, the interest taxonomy 700 can be used to identify one or more inferred interests. An inferred interest can be identified based on its connection with an identified direct interest. By way of a non-limiting example, each child node of a matching node can be identified as an inferred interest. In the example shown in FIG. 7, nodes 706, 708 and 710 are child nodes of node 704, and the interests, Reykjavik, Eyjafjalla and Geysir, can be identified as inferred interests of the user by virtue of their connection, e.g., a parent-child connection, with node 704.

In accordance with one or more embodiments, both direct and inferred interests may be used to identify content for the user. A direct interest might be considered to be more representative of a user's interests, since it matches a keyword from the data collected for the user. On the other hand, an inferred interest may be more focused on the interest of the user. In the example shown in FIG. 7, the user may be more interested in Iceland, and may have a particular interest in a given location in Iceland, which may not be indicated from the data collected for the user. In addition, an inferred interest identified in accordance with one or more embodiments of the present disclosure might be used to provide the user with content related to the interred interest to which the user might not otherwise be exposed using a direct interest.

Referring to FIG. 8, a determination is made whether any data collected for a user remains to be processed. If not, processing ends; processing might resume when further data is collected for the user, for example. If it is determined, at step 802, that data remains to be processed, processing continues at step 804, At step 804, a keyword, which can comprise one or more words, terms, etc., is retrieved from the data remaining to be processed. At step 808, the keyword can optionally preprocessed. By way of a non-limiting example, each word in the keyword can be tokenized to identify a base keyword that is to be used to search the interest taxonomy 700 of FIG. 7.

At step 808, the base keyword, e.g., Iceland, is used to search the interest taxonomy 700. A determination is made, at step 810, whether or not a matching node is found in the interest taxonomy 700. If not processing continues at step 802 to process any remaining data collected from the user's activity within the digital messaging application(s). If so, processing continues at step 812, to identify each user interest based on the match. In the example of FIG. 7, the interests associated with nodes 702, 704, 706, 708 and 710 are identified as interests of the user based on the match between the Iceland keyword and the Iceland interest represented by node 704, Referring again to FIG. 6, at step 612, the user's interest profile record is updated to reflect any new interests identified for the user. The user's interest profile can be updated to include additional data, e.g., link click data 502, By way of a non-limiting example, the update(s) to the user's interest profile can be synchronized with the stored, e.g., a remote, copy of the user's interest profile through RPC.

Figure 9:
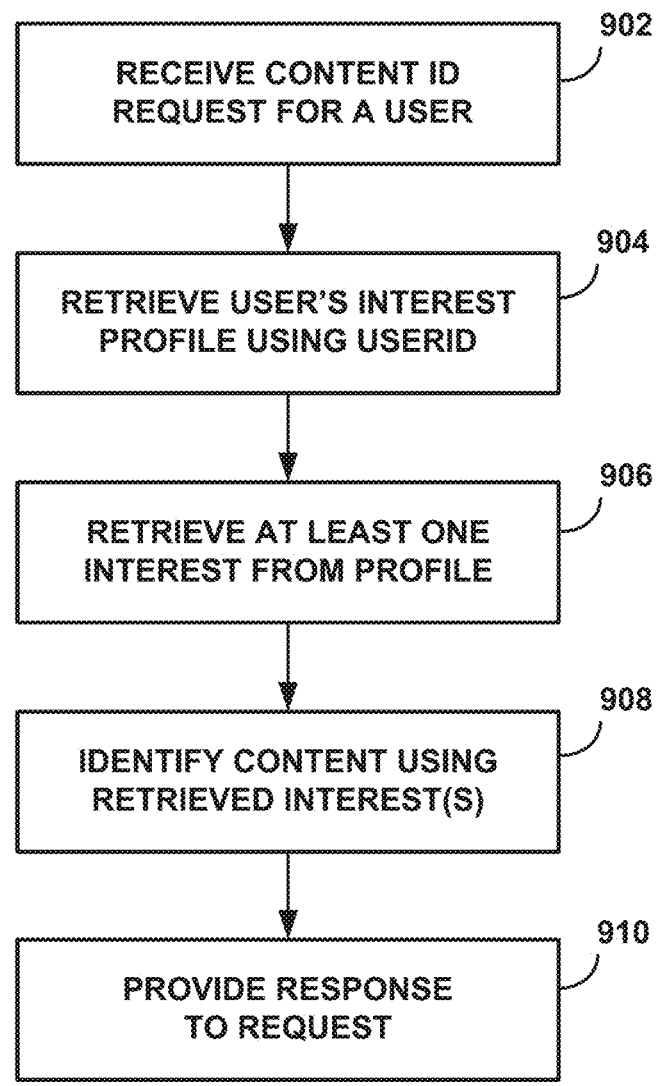

In accordance with one or more embodiments, a user's interests can he used to identify content to be provided to the user. FIG. 9 provides a process flow example in accordance with one or more embodiments of the present disclosure. The process flow shown in the example of FIG. 9 can be implemented as a component of, or a component used by, a recommendation system to generate one or more recommendations, e.g., content recommendations, using the user's interests. By way of another non-limiting example, the process flow can be implemented as a component of, or a component used by, an ad server, to identify one or more advertisement content items for a user using the user's interest(s). As yet another non-limiting example, the process flow can be implemented as a component of, or a component used by, a search engine to identify and/or rank search results relevant to a user using the user's interest(s). As yet another non-limiting example, the process flow can be implemented as a component of, or a component used by, a collaborative filtering system, to identify content based on similar user interests.

By way of another non-limiting example, the process flow can be implemented as a component of, or a component used by, a web server serving content to a user, and the content may comprise one or more advertisements, news articles, audio, video, multimedia, etc. content items, etc. to be presented, e.g., displayed, in the web page, or in connection with the web page.

Examples of types of content items that can be identified using the process shown in FIG. 9 include without limitation image content, multimedia content, audio content, video content, text, etc.

At step 902, a content identification request is received in connection with a given user. At step 904, the user's identification information, which can include a userid, is used to retrieve the user's interest profile. By way of a non-limiting; example, the user's interest profile can be retrieved through RPC. At step 906, at least one interest of the user can be retrieved from the user's interest profile. At step 908, the at least one interest retrieved from the user's interest profile can be used to identify at least one content item in response to the request. A response can be provided, which can include information identifying the at least one content item, at step 910.

As described herein, digital message application user activity, such as and without limitation link click activity can be used to identify user interest. The present inventors have determined that click count on links in digital messages is higher than clicks on advertisements in mail. Click count volume on native, e.g., stream ads, and traditional display advertising, e.g., graphical ads, provided by online providers, e.g., email providers, on their offerings is often one to two orders of magnitude lower than the volume of in-message link clicks, Accordingly, it is beneficial to be able to detect in-message link selection events, collect data in response to each event and use the collected data to identify interests of users.

In accordance with one or more embodiments, in-message link selection event data collection and analysis performed in accordance with one or more embodiments of the present disclosure can be used alone or in combination with data collection and analysis of ad click events, e.g., in-message ad click events, for targeting advertisements, recommending content, customizing or personalizing web page content, etc.

Embodiments of the present disclosure provide an ability to understand and use click data and behavior of users in connection with content links included in digital messaging. In-content click events can be used to determine user interest, which can be used to provide the user various types of content determined to be of interest to the user using the user's in-content click events.

A digital message may include both ad links, which include a tracking component. The tracking component can be used to analyze an existing ad campaign's effectiveness. For example, an advertisement's URL can include a tracking component to track the number of clicks on the advertisement to determine the effectiveness of the advertisement. In contrast, embodiments of the present disclosure can detect link click events and analyze data collected in response to each link click event to determine a user's interests.

Embodiments of the present disclosure detect and collect data in response to user click events, e.g., user selection of in-message links. Examples of in-content click events can include without limitation a user's selection of a link to a travel site's web page, an online merchant's product and/or service web page, a weather site, a restaurant's web page, a social media web page, a news website, a financial web site, sports web site, etc. Embodiments of the present disclosure use in-content link clicks to identify user interest and intent, which can be used to target advertisement, recommend content, personalize web page presentation, etc.

In accordance with one or more embodiments, a digital message can be a marketing message, e.g., a marketing email targeted to reflect a user's interests. By way of a non-limiting example, an online merchant may send an email to a user containing links to products and/or services considered to be of interest to the user. By way of some further non-limiting examples, Amazon® may send an email reminder about items recently added to a user's cart but not checked out, Groupon® may send an email about local deals from Groupon®, a local real estate website/agent may send an email with local real estate listings, etc.

The fact that a user clicked on a link within a marketing message indicates a more deliberate intent to transact than when a user clicks on an ad on a traditional display advertising channel. When a user opens a marketing message and clicks on a link within the message, the user's interest can be considered to be quite significant. Embodiments of the present disclosure detect the user's selection of link click within a digital message, such as and without limitation a marketing message, collect data in connection with the link click event and identify the user's interest using the collected data. By collecting, analyzing, and aggregating information from clicks within marketing messages targeting users identified by a third-party, such as and without limitation Amazon®, Groupon®, etc., embodiments of the present disclosure use third-party targeting in identifying user interest and intent.

Figure 10:
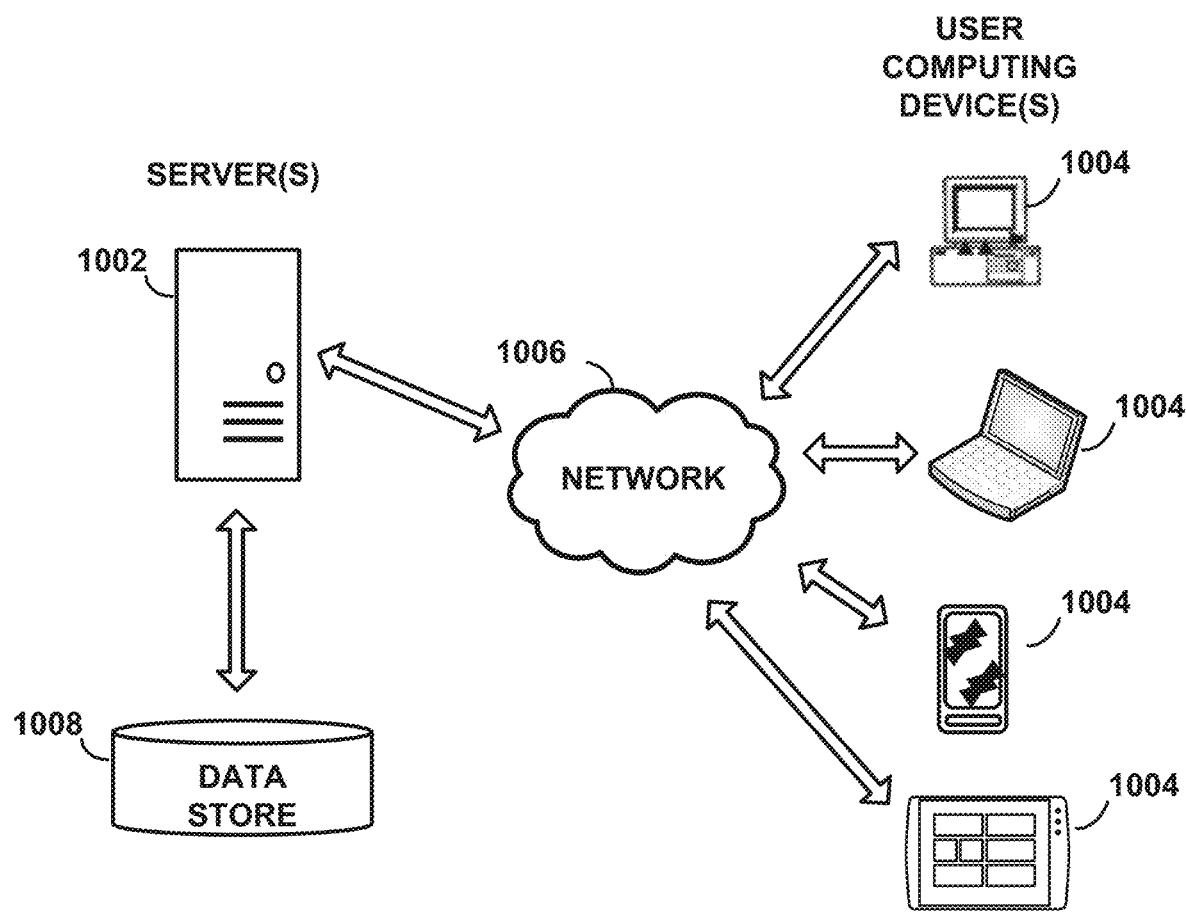
FIG. 10 illustrates some components that can be used in connection with one or more embodiments of the present disclosure.

FIG. 10 illustrates some components that can be used in connection with one or more embodiments of the present disclosure. In accordance with one or more embodiments of the present disclosure, one or more computing devices, e.g., one or more servers, user devices or other computing device, are configured to comprise functionality described herein. For example, a computing device 1002 can be configured to execute program code, instructions, etc. to provide functionality in accordance with one or more embodiments of the present disclosure. The same or another computing device 1002 may be configured to execute program code to implement functionality in accordance with one or more embodiments of the present disclosure.

Computing device 1002 can serve content to user computing devices 1004 using a browser application via a network 1006. Data store 1008 can be used to store program code to configure a server 1002 to functionality in accordance with one or more embodiments of the present disclosure.

The user computing device 1004 can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 1002 and the user computing device 1004 can include one or more processors, memory, a removable media reader, network interface, display and interface, and one or more input devices, e.g., keyboard, keypad, mouse, etc. and input device interface, for example. One skilled in the art will recognize that server 1002 and user computing device 1004 may be configured in many different ways and implemented using many different combinations of hardware, software, or firmware.

In accordance with one or more embodiments, a computing device 1002 can make a user interface available to a user computing device 1004 via the network 1006. The user interface made available to the user computing device 1004 can include content items, or identifiers (e.g., URLs) selected for the user interface in accordance with one or more embodiments of the present invention. In accordance with one or more embodiments, computing device 1002 makes a user interface available to a user computing device 1004 by communicating a definition of the user interface to the user computing device 1004 via the network 1006. The user interface definition can be specified using any of a number of languages, including without limitation a markup language such as Hypertext Markup Language, scripts, applets and the like. The user interface definition can be processed by an application executing on the user computing device 1004, such as a browser application, to output the user interface on a display coupled, e.g., a display directly or indirectly connected, to the user computing device 1004.

In an embodiment the network 1006 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (CPRS), Enhanced Data. GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 10. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

FIG. 11 is a detailed block diagram illustrating an internal architecture of a computing device, e.g., a computing device such as server 1002 or user computing device 1004, in accordance with one or more embodiments of the present disclosure. As shown in FIG. 11, internal architecture 1100 includes one or more processing units, processors, or processing cores, (also referred to herein as CPUs) 1112, which interface with at least one computer bus 1102. Also interfacing with computer bus 1102 are computer-readable medium, or media, 1106, network interface 1114, memory 1104, e.g., random access memory (RAM), run-time transient memory, read only memory (ROM), etc., media disk drive interface 1120 as an interface for a drive that can read and/or write to media including removable media such as floppy, CD-ROM, DVD, etc. media, display interface 1110 as interface for a monitor or other display device, keyboard interface 1116 as interface for a keyboard, pointing device interface 1118 as an interface for a mouse or other pointing device, and miscellaneous other interfaces not shown individually, such as parallel and serial port interfaces, a universal serial bus (USB) interface, and the like.

Memory 1104 interfaces with computer bus 1102 so as to provide information stored in memory 1104 to CPU 1112 during execution of software programs such as an operating system, application programs, device drivers, and software modules that comprise program code, and/or computer-executable process steps, incorporating functionality described herein, e.g., one or more of process flows described herein. CPU 1112 first loads computer-executable process steps from storage, e.g., memory 1104, computer-readable storage medium/media 1106, removable media drive, and/or other storage device. CPU 1112 can then execute the stored process steps in order to execute the loaded computer-executable process steps. Stored data, e.g., data stored by a storage device, can be accessed by CPU 1112 during the execution of computer-executable process steps.

Persistent storage, e.g., medium/media 1106, can be used to store an operating system and one or more application programs. Persistent storage can also he used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
   detecting, by a content recommendation system server, a user's interaction with a digital message via a digital messaging application's user interface at the user's computing device, the digital message including a link, the user interaction with the digital message causing insertion of the link in the digital message prior to the message being sent;
   collecting, by the content recommendation system server, data in response to the detection of the user interaction, the collected data comprising:
      first data derived from content included in the digital message and data related to the digital message, and
      second data derived from the link and data related to a destination web page that corresponds to the link;
   analyzing, by the content recommendation system server, the collected data to determine at least one interest of the user, the analysis using a first interest taxonomy and a second interest taxonomy different from the first interest taxonomy and comprising:
      analyzing the first data based on the first interest taxonomy, and
      analyzing the second data based on the second interest taxonomy;
   updating, by the content recommendation system server, an interest profile of the user based on said analysis of the collected data;
   determining, by the content recommendation system server, a content recommendation based on the updated interest profile; and
   causing, by the content recommendation system server, a web page to be updated in accordance with the content recommendation.

2. The method of claim 1, the method further comprising:
   retrieving, by the content recommendation system server, content from the destination web page using a universal resource locator (URL) of the destination web page included in the link, the data related to a destination web page comprising at least a portion of the content from the destination page.

3. The method of claim 1, analyzing the first data further comprising:
   extracting keywords from the first data and analyzing the keywords extracted from the first data based on the first interest taxonomy.

4. The method of claim 1, analyzing the second data further comprising:
   extracting keywords from the second data and analyzing the keywords extracted from the second data based on the second interest taxonomy.

5. The method of claim 1, updating the interest profile further comprising adding the at least one interest of the user to the interest profile.

6. The method of claim 1, causing a web page to be updated further comprising causing the web page to be updated to include information identifying at least one content item recommendation determined in accordance with the at least one interest of the user.

7. The method of claim 1, the digital message is an email message and the collected data used in determining the at least one interest of the user comprising sender information and subject information of the email message.

8. A non-transitory computer-readable storage medium tangibly encoded with computer-executable instructions that when executed by a processor associated with a computing device perform a method comprising:
  detecting a user's interaction with a digital message via a digital messaging application's user interface at the user's computing device, the digital message including a link, the user interaction with the digital message causing insertion of the link in the digital message prior to the message being sent;
  collecting data in response to the detection of the user interaction, the collected data comprising:
    first data derived from content included in the digital message and data related to the digital message, and
    second data derived from the link and data related to a destination web page that corresponds to the link;
  analyzing the collected data to determine at least one interest of the user, the analysis using a first interest taxonomy and a second interest taxonomy different from the first interest taxonomy and comprising:
    analyzing the first data based on the first interest taxonomy, and
    analyzing the second data based on the second interest taxonomy;
  updating an interest profile of the user based on said analysis of the collected data;
  determining a content recommendation based on the updated interest profile; and
  causing a web page to be updated in accordance with the content recommendation.

9. The non-transitory computer-readable storage medium of claim 8, the method further comprising:
  retrieving content from the destination web page using a universal resource locator (URL) of the destination web page included in the link, the data related to a destination web page comprising at least a portion of the content from the destination page.

10. The non-transitory computer-readable storage medium of claim 8, analyzing the first data further comprising:
  extracting keywords from the first data and analyzing the keywords extracted from the first data based on the first interest taxonomy.

11. The non-transitory computer-readable storage medium of claim 8, analyzing the second data further comprising:
  extracting keywords from the second data and analyzing the keywords extracted from the second data based on the second interest taxonomy.

12. The non-transitory computer-readable storage medium of claim 8, updating the interest profile further comprising adding the at least one interest of the user to the interest profile.

13. The non-transitory computer-readable storage medium of claim 8, causing a web page to be updated further comprising causing the web page to be updated to include information identifying at least one content item recommendation determined in accordance with the at least one interest of the user.

14. The non-transitory computer-readable storage medium of claim 8, the digital message is an email message and the collected data used in determining the at least one interest of the user comprising sender information and subject information of the email message.

15. A content recommendation system server comprising:
  a processor configured to:
    detect a user's interaction with a digital message via a digital messaging application's user interface at the user's computing device, the digital message including a link, the user interaction with the digital message causing insertion of the link in the digital message prior to the message being sent;
    collect data in response to the detection of the user interaction, the collected data comprising:
      first data derived from content included in the digital message and data related to the digital message, and
      second data derived from the link and data related to a destination web page that corresponds to the link;
    analyze the collected data to determine at least one interest of the user, the analysis using a first interest taxonomy and a second interest taxonomy different from the first interest taxonomy and comprising:
      analyze the first data based on the first interest taxonomy, and
      analyze the second data based on the second interest taxonomy;
    update an interest profile of the user based on said analysis of the collected data;
    determine a content recommendation based on the updated interest profile; and
    cause a web page to be updated in accordance with the content recommendation.

* * * * *